United States Patent Office 3,264,279
Patented August 2, 1966

3,264,279
PROCESS FOR THE TEMPORARY PROTECTION OF AMINO GROUPS IN AMINO-CARBOXYLIC ACIDS AND THEIR DERIVATIVES
Robert Schwyzer, Riehen, and Werner Rittel, Basel, Switzerland, assignors to Ciba Corporation, a corporation of Delaware
No Drawing. Filed Aug. 2, 1960, Ser. No. 46,893
Claims priority, application Switzerland, Aug. 24, 1959, 77,291
10 Claims. (Cl. 260—112.5)

The present invention relates to a process for the temporary protection of the amino group of the aminolower-alkyl radical in $\alpha$-(amino-lower-alkyl)-$\alpha$-aminoacetic acids and their derivatives by means of the tertiary butyloxycarbonyl radical; $\alpha$-(amino-lower-alkyl)-$\alpha$-aminoacetic acids are, for example, $\alpha$:$\gamma$-diamino-butyric acid, ornithine, hydroxylysine and especially lysine.

As derivatives of the afore-mentioned $\alpha$-(amino-loweralkyl)-$\alpha$-amino acetic acids are suitable those of the acid group, or of the $\alpha$-amino group or of both these groups. Thus, the acid group may be esterified or it may be present in the form of an anhydride, hydrazide or azide, or, as in the case of peptides, it may be present as an acid amide grouping. The $\alpha$-amino group may be for example blocked by one of the protective groups usual in peptide chemistry, above all by one that can be eliminated by hydrogenolysis, such as the carbobenzoxy group (hereinafter referred to by Z for short), or the para-(phenylazo)-benzyloxy-carbonyl group (PZ) or the para - (para'-methoxyphenylazo) - benzyloxy - carbonyl group (MZ). Alternatively, the $\alpha$-amino group may form part of an acid amide group, as in a peptide.

Numerous biologically important polypeptides contain radicals of $\alpha$-aminoalkyl-$\alpha$-amino-acetic acids, especially of lysine, thus for example, lysine-vasopressin, the hormones having a stimulating effect on melanophores, corticotropin and insulin. Accordingly, methods of synthesing peptides containing radicals of $\alpha$-aminoalkyl-$\alpha$-amino-acetic acids, especially lysine, are very valuable.

The success of such a synthesis depends substantially on the selection of suitable protective groups for blocking the amino groups not in the $\alpha$-position of these amino acids, for example of the $\epsilon$-amino group of lysine.

The protective groups hitherto used in peptide chemistry can in some cases not be eliminated without changing the molecule, so that their applicability is restricted; some of them impede the selective elimination of other protective groups present, be it an amino or a carboxyl group.

The carbobenzoxy group or equivalent groups, for example the para-(phenylazo)-benzyloxy-carbonyl group or the para - (para'-methoxyphenylazo)-benzyloxy-carbonyl group, have in certain peptide syntheses the disadvantage that they can be eliminated both by reduction and hydrolysis so that they impede the selective liberation of the $\alpha$-amino group blocked by means of protective groups suitable for elimination in the same manner. Furthermore, of the conventional methods used for eliminating these groups, the catalytic hydrogenation cannot be applied to sulfur-containing peptides. Elimination with hydrogen halide in an organic solvent can in many cases not be used because the benzyl halide formed in the course of this operation acts as a benzylating agent (for example: the sulfur atom in methionine is benzylated). Finally, the reduction with sodium in liquid ammonia is accompanied by many disturbing side reactions; moreover, the selective hydrogenolytic liberation of benzyl ester groups in the presence of such carbobenzoxy radicals is impossible.

While the trityl group can be eliminated by mild acid hydrolysis, it is also affected by catalytic hydrogenation so that also in this case the use of groups that can be eliminated by hydrogenolysis, such as Z, PZ or MZ at the $\alpha$-amino group, is rendered impossible when the other amino group is blocked by tritylation.

Finally—while the trifluoroacetyl radical is eliminated by alkali under relatively mild conditions, carboxyl groups protected by esterification are at the same time affected by this operation; consequently, the trifluoroacetyl radical is likewise not generally applicable.

The present invention is based on the observation that the tertiary butyloxy-carbonyl radical can be used generally and without the above-mentioned disadvantages successfully for the protection of the amino group of the aminoalkyl radical in $\alpha$-aminoalkyl-$\alpha$-amino-acetic acids and derivatives thereof. The tertiary butyloxycarbonyl group is not affected by the catalytic hydrogenation; it can therefore be used in the case of hydrogenolytically eliminatable groups such as Z, PZ, MZ, trityl and the like, for the selective protection and liberation of the $\alpha$-amino groups. In addition, it can also be eliminated by extremely mild acid hydrolysis without concurrent elimination of any ester groups present or any other disturbing side reactions taking place. On the other hand, an ester group is easy to eliminate by alkaline hydrolysis without the tertiary butyloxy-carbonyl group being eliminated at the same time.

The products of the process, $\alpha$-(tertiary butyloxycarbonylamino-lower-alkyl)-$\alpha$-amino-acetic acids and their derivatives, are new. They are valuable intermediate products for the peptide synthesis. For example, the procedure used for synthesizing peptides may consist in protecting the $\alpha$-amino group in $\alpha$-(tertiary butyloxycarbonylaminoalkyl)-$\alpha$-amino acetic acids, for example in $N^\epsilon$-tertiary butyloxycarbonyl-lysine, in a conventional manner by means of a radical that can be split off by hydrolysis, for example Z, PZ or MZ, and using the free carboxyl group for the formation of a new peptide bond, if desired after having been converted into a reactive derivative.

The hydrogenolytic elimination of the protective group in the $\alpha$-position then yields a derivative which contains a free amino group and is suitable for the further peptide synthesis. On completion of the synthesis the tertiary butyloxy-carbonyl group can be eliminated by mild acid hydrolysis, for example by means of gaseous hydrogen halide, e.g. hydrogen chloride in an organic solvent, for instance a lower alkanol, or of a dilute aqueous mineral acid.

Alternatively when a peptide is to be manufactured in which the bond is not intended to be through the $\alpha$-amino group but through the other amino group, the $\alpha$-amino group can in a first stage be blocked in the manner described above, the tertiary butyloxy-carbonyl radical then being selectively eliminated by mild acid hydrolysis and the free amino group being used for forming a new peptide bond. Finally, the protective group at the $\alpha$-amino group is eliminated by a method as such known.

In a peptide ester containing a tertiary butyloxy-carbonylamino group and a hydrogenolytically eliminatable protective group at the $\alpha$-amino group, the carboxyl group can be eliminated by alkaline hydrolysis and used for forming a further peptide bond, if desired after having been converted into a reactive derivative.

For example, by the process of the invention the dipeptide L-lysil-L-lysine may be prepared according to the following diagram, derivatives useful for further peptide syntheses being obtained as intermediate products at the same time:

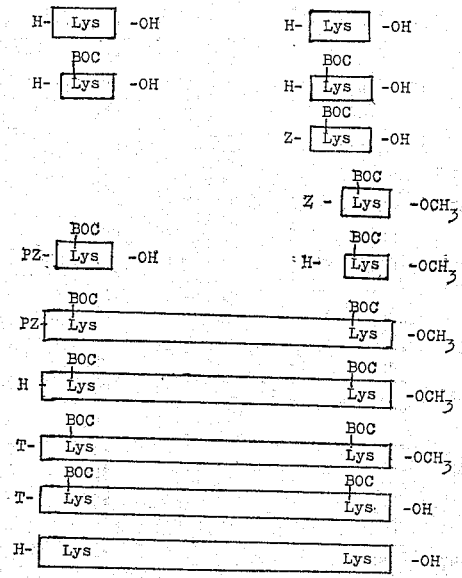

BOC represents the tertiary butyloxycarbonyl radical, T the trityl-(triphenylmethyl) radical.

The pentapeptide radical L-lysyl-L-lysyl-L-arginyl-L-arginyl-L-prolyl, an intermediate in the synthesis of the adrenocorticotropic hormones, may be obtained according to the following diagram:

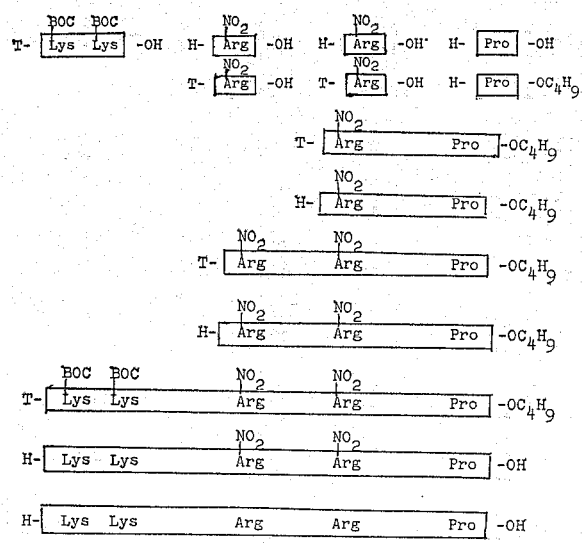

Another intermediate in the synthesis of ACTH, L-lysyl-L-prolyl-L-valyl-glycine, may be obtained, for example, according to the following diagram:

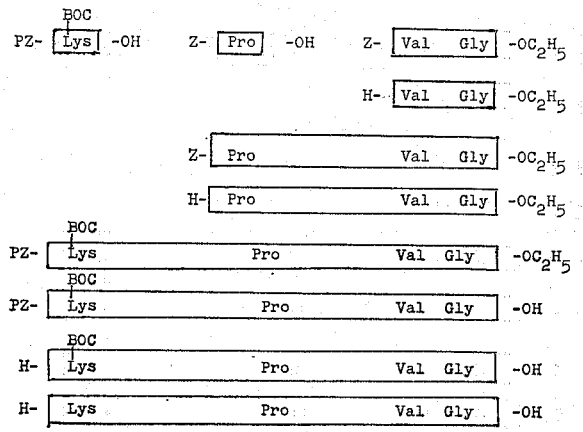

The introduction of the tertiary butyloxycarbonyl group is advantageously performed by acylating a metal complex, preferably a copper complex, of the free amino acid, or by acylating those derivatives in which the α-amino group is protected or is present in a peptide bond.

The acylation is advantageously performed with a reactive acid derivative of the carbonic acid tertiary butyl semi-ester, such as a halide, for instance the chloride, the cyanide, the anhydride, or an activated phenyl ester, for instance p-nitrophenylester, p-methane sulfonic acid phenyl ester, p-cyano-phenylester. It has been observed that the acylation can be performed most advantageously with the azide. Unexpectedly it has been observed that the acylation proceeds particularly advantageously when the reaction with the azide is carried out with an aqueous solution of the copper complex of the acid. The copper complex can then be decomposed in the usual manner.

Free α-amino or carboxyl groups in the resulting tertiary butyloxycarbonyl compounds can then be converted in the usual manner or functionally converted α-amino or carboxyl groups can be liberated at any desired stage of the process.

Inter alia, the α-amino groups can be acylated, for example substituted by the afore-mentioned hydrogenolytically eliminatable protective groups or by radicals of further amino acids or peptides. Free carbonic acid groups can likewise be protected, for example esterified particularly by means of a lower alkanol, such as methanol, ethanol, propanol or butanol, or converted into reactive derivatives, such as reactive esters, anhydrides or azides or into amide groups, for example those of amino acids or peptides.

Furthermore, it is possible, for example at any desired stage, to eliminate the specified protective groups of the α-amino group by hydrogenolysis and/or to hydrolyse ester groups while retaining the tertiary butyloxy-carbonyl protective group.

The afore-mentioned reactions are carried out in the usual manner at the ordinary or a lower or elevated temperature, in the presence or absence of a diluent and/or condensing agent or catalyst, under atmospheric or superatmospheric pressure.

The invention further includes any variant of the present process in which an intermediate obtained at any stage of the process is used as starting material and the remaining step or steps is/are carried out, or the process is discontinued at any stage thereof.

Depending on the reaction conditions employed compounds with free amino and/or carboxylic acid groups are obtained in the form of their salts with acids and/or bases. These compounds can be converted into each other in the conventional manner.

The following examples illustrate the invention.

EXAMPLE 1

$N^\epsilon$-tertiary butyloxy-carbonyl-L-lysine (a) Copper complex: 15 grams of L-lysine monohydrochloride are dissolved in 150 cc. of water, 15 grams of basic copper carbonate are added, and the reaction mixture is heated at the boil for 1 hour. The undissolved copper carbonate is then suctioned off and rinsed with a small amount of water. After cooling the intensity blue copper-lysine solution (volume: 180 cc.) is treated with 5.4 grams of magnesium oxide and a solution of 20.8 grams of tertiary butyloxy-azidoformate in 260 cc. of methanol and vigorously stirred for 18 hours at 45° C., during which the copper complex of $N^\epsilon$-tertiary butyloxycarbonyl-L-lysine separates out as a pale-blue precipitate. To remove the excess magnesium oxide the reaction mixture is cooled with ice and treated with 200 cc. of icecold 2 N-acetic acid solution and then stirred for 1 hour at 5° C. The pale-blue $N^\epsilon$-tertiary butyloxycarbonyl-L-lysine copper complex is then suctioned off, thoroughly washed with water and methanol and dried. Yield: 14 grams (62% of theory). The product melts at about 220–240° C. with decomposition.

(b) Free $N^\epsilon$-tertiary butyloxycarbonyl-L-lysine from the copper complex: The copper complex of $N^\epsilon$-tertiary butyloxycarbonyl-L-lysine (14 grams) obtained as described above under (a) is suspended in 300 cc. of water, and 50 cc. of 2 N-ammonia solution are added, whereupon partial dissolution occurs. While stirring the mixture vigorously, a strong current of hydrogen sulfide is then introduced for about 3 hours. The precipitated copper sulfide is then suctioned off through a carbon filter, the clear filtrate is cooled with ice and treated with 75 cc. of 2 N-acetic acid, and air is then passed through the mixture until the latter has lost its odor of hydrogen sulfide. The solution is concentrated in vacuo at 40° C., and a first fraction of $N^\epsilon$-tertiary butyloxycarbonyl-L-lysine separates out in microcrystalline form. Repeated concentration of the mother liquor yields a total of 11.5 grams of crude $N^\epsilon$-tertiary butyloxycarbonyl-L-lysine melting at 235–255° C. (=92% of theory). The crude product can be purified by recrystallization from water, whereupon it melts at 245–251° C.

The product is sparingly soluble in the conventional organic solvents; it is slightly soluble in water and readily soluble in dilute alkalies. In dilute hydrochloric acid it dissolves with evolution of gas (decomposition; see below).

The paper-chromatographic examination reveals the following $R_F$ values:

In the system tertiary butanol/n-butanol/water (40:30:30) _____ 0.73
In the system secondary butanol/isopropanol/monochloracetic acid/water (70:10:3:40) _____ 0.80

The tertiary butyloxycarbonyl group can be eliminated in the known manner by means of hydrogen halide in an organic solvent or advantageously in a dilute aqueous acid. A sample of $N^\epsilon$-tertiary butyloxycarbonyl-L-lysine decomposes on being dissolved in 2 N-hydrocloric acid with evolution of gas at room temperature. A paper-chromatographic examination performed after 30 minutes reveals only the presence of lysine, no starting material being detected.

EXAMPLE 2

$N^\alpha$-carbobenzyloxy-$N^\epsilon$-tertiary butyloxycarbonyl-L-lysine 2.46 grams of the crude $N^\epsilon$-tertiary butyloxycarbonyl-L-lysine obtained as described in Example 1 are dissolved with ice cooling in 5.5 cc. of 2 N-sodium hydroxide solution, and while stirring the mixture there are added dropwise within 30 minutes simultaneously 6.0 cc. of 2 N-sodium hydroxide solution and a solution of 1.90 grams of carbobenzoxy chloride in 3 cc. of toluene. The reaction mixture is stirred on for 2 hours at 5–10° C., after which the toluolic phase is separated. The aqueous solution is washed with a small amount of ether and, while being cooled with ice, adjusted with citric acid solution of 10% strength pH=2. The separated oil is taken up in ether, and the ethereal solution is washed with a small amount of water and dried over sodium sulfate. Evaporation of the solution yields $N^\alpha$-carbobenzyloxy-$N^\epsilon$-tertiary butyloxycarbonyl-L-lysine as an oil which can be further reacted as it is.

EXAMPLE 3

$N^\epsilon$-tertiary butyloxycarbonyl-L-lysine methyl ester (a) $N^\alpha$-carbobenzyloxy-$N^\epsilon$-tertiary butyloxycarbonyl-L-lysine methyl ester: 0.88 gram of the crude product obtained as described in Example 2 is dissolved in 30 cc. of ether and 5 cc. of an ethereal 0.6 N-diazomethane solution are added. The yellow solution is kept for 15 minutes at room temperature. The excess diazomethane is removed in vacuo and the ethereal solution is washed with sodium bicarbonate solution and with water, dried over sodium sulfate and evaporated. To purify the oily residue it is chromatographed on 50 times the amount of silica gel ("Davison," mesh 200). The eluates obtained with 1:4-mixtures of benzene and chloroform yield analytically pure $N^\alpha$-carbobenzyloxy-$N^\epsilon$-tertiary butyloxycarbonyl-L-lysine methyl ester in the form of an oil.

(b) $N^\epsilon$-tertiary butyloxycarbonyl-L-lysine methyl ester: 265 mg. of the chromatographically purified product obtained as described under (a) above are dissolved in 20 cc. of methanol and hydrogenated in the presence of palladium black (10% Pd), the carbon dioxide formed being bound with caustic soda. After slightly more than the calculated amount of hydrogen has been absorbed, the hydrogenation comes to a standstill. The catalyst is filtered off and the filtrate evaporated, to yield $N^\epsilon$-tertiary butyloxycarbonyl-L-lysine methyl ester in the form of an oil. The crude product is sufficiently pure for further reactions. For characterization it can, if desired, be converted into the crystalline hydrochloride: A specimen of the oily ester is dissolved in a small amount of methanol, the solution is cooled to $-15°$ C. and the accurately calculated amount of hydrochloric acid in methanol is added. Evaporation of the solution yields crystalline $N^\epsilon$-tertiary butyloxycarbonyl-L-lysine methyl ester hydrochloride: after trituration with ether it melts at (130°) 135–148° C. By recrystallization from methanol+ether an analytically pure product, melting at 148–151° C., is obtained in the form of needles.

EXAMPLE 4

$N^\alpha$-(para-phenylazo-benzyloxycarbonyl)-$N^\epsilon$-tertiary butyloxycarbonyl-L-lysine 2.46 grams of the crude product obtained as described in Example 1 are turned into a fine powder, which is suspended in 30 cc. of water, 1.00 gram of magnesium oxide is added, and the whole is stirred for 1 hour at 5° C. 30 cc. of dioxane are then added, and while stirring vigorously a solution of 3.30 grams of para-phenylazo-benzyloxycarbonyl chloride in 30 cc. of dioxane is added dropwise in the course of 30 minutes. The reaction mixture is vigorously stirred overnight at room temperature, 200 cc. of water are then added, and the dioxane is expelled in vacuo, whereupon a copious precipitate of an amorphous orange-red material is formed [mixture of para-phenylazo-benzyl alcohol and the magnesium salt of $N^\alpha$-(para-phenylazo-benzyloxycarbonyl) - $N^\epsilon$ - tertiary butyloxycarbonyl-L-lysine]. A large amount of ethyl acetate is added, the mixture is cooled to 5° C., and the aqueous phase is adjusted to pH 2 with ice-cold citric acid solution of 10% strength. When the mixture is shaken, all of the coloured matter dissolves in the ethyl acetate. The ethyl acetate solution is then washed with some water and then repeated with dilute ammonium hydroxide solution until the latter runs pale-yellow. (The organic phase is still of intense orange-red color and yields on evaporation 1.5 grams of crude para-phenylazo-benzyl alcohol.)

The intensely orange-yellow ammonium hydroxide extracts are combined, covered with much ether and while being cooled to 5° C. adjusted with citric acid solution of 10% strength to pH=2, whereupon a yellow oil precipitates; it is taken up in ether, and the ethereal solution is washed with water while being cooled with ice and then dried over sodium sulfate and evaporated. The residue (3.0 grams of an orange resin) is purified by chromatography on 50 times its weight of silica gel. The eluates obtained with chloroform yield $N^\alpha$-(para-phenylazo-benzyloxycarbonyl)-$N^\epsilon$-tertiarybutyloxycarbonyl-L-lysine which crystallizes from ether+petroleum ether in orange-yellow needles melting at 102–104° C. Recrystallization from acetone+ether yields an analytically pure product melting at 105–106° C.

The substance is soluble in most organic solvents, sparingly soluble in water and petroleum ether, and soluble in dilute alkalies.

EXAMPLE 5

$N^\alpha$-(para-phenylazo-benzyloxycarbonyl)-$N^\epsilon$-tertiary butyloxycarbonyl-L-lysyl-$N^\epsilon$-tertiary butyloxycarbonyl-L-lysine methyl ester To a solution of 5.19 grams of $N^\epsilon$-tertiary butyloxycarbonyl-L-lysine methyl ester and 9.70 grams of $N^\alpha$-(para-phenylazo-benzyloxycarbonyl) - $N^\epsilon$ - tertiary butyloxycarbonyl-L-lysine in 120 cc. of acetonitrile is cooled to −15° C. are added 4.35 grams of dicyclohexylcarbodiimide. After a short time the reaction mass has solidified to a jelly-like mass. After keeping the reaction product for 30 minutes at −15° C. and for 2 days at 2° C., much ethyl acetate is added whereby the orange jelly-like material dissolves and the dicyclohexylurea remains undissolved. It is suction-filtered (4.14 grams, M.P. 224–226° C.), and the filtrate washed with citric acid solution of 5% strength, water, sodium bicarbonate solution and water while cooling with ice, dried with sodium sulfate and evaporated. The residue (16.3 grams) is triturated with 100 cc. of ether and then crystallizes. 10.9 grams of dipeptide derivative melting at (111° C.) 119–127° C. are obtained. The crystals still contain a little dicyclohexylurea. In order to separate the latter a little acetone is added, 175 mg. of urea remaining undissolved. After being filtered with suction, the filtrate is treated with much ether, 9.14 grams of pure dipeptide derivative being obtained in the form of needles; M.P. 124–128° C.; optical rotation $[\alpha]_D^{26}$=−2.0±0.8° (c.=1.00 in methanol).

300 mg. of pure dipeptide derivative are obtained from the mother liquors by adsorption on silica gel ("Davison," mesh 200, with the addition of 10% of water) and elution with a mixture of benzene and chloroform (1:4).

EXAMPLE 6

$N^\epsilon$-tertiary butyloxycarbonyl-L-lysyl-$N^\epsilon$-tertiary butyloxycarbonyl-L-lysine methyl ester 1.29 grams of the product obtained in Example 5 are dissolved in 80 cc. of methanol, 3 cc. of N-aqueous acetic acid solution are added, and hydrogenation is carried out in the presence of palladium carbon (10% Pd); the carbon dioxide formed is collected in a second hydrogenation vessel filled with sodium hydroxide solution. After the calculated quantity of hydrogen has been taken up, hydrogenation ceases. The catalyst is filtered off with suction, and the filtrate evaporated to dryness. The oily residue is distributed between 10 cc. of N-acetic acid and 50 cc. of ether, and the acetic acid solution passed through another separating funnel with 30 cc. of ether. Both ethereal phases are washed with a little acetic acid solution, the aqueous phases combined, evaporated to dryness and, in order to remove the acetic acid, the oily residue is distributed between 20 cc. of water-saturated n-butanol and 5 cc. of saturated potassium carbonate solution with ice-cooling. After drying and evaporation, the butanol solution yields 805 mg. of a colorless glass (93% of the theoretical yield). The product is unitary according to paper-chromatography; in the n-propanol-ethanol-water (7:1:2) system the $R_f$ value=0.88, and in the system n-butanol-ethanol-water (2:2:1) the $R_f$ value=0.91.

EXAMPLE 7

$N^\alpha$-(para-phenylazo-benzyloxycarbonyl)-$N^\epsilon$ - tertiary butyloxycarbonyl-L-lysyl-$N$-tertiary butyloxycarbonyl-L-lysine 145 mg. of the product obtained in Example 5 are dissolved in 3 cc. of dioxane, 1 cc. of water added, the solution cooled to 5° C. and 0.22 cc. of 1.0 N-sodium hydroxide solution (1.1 equivalents) is added. The clear solution is allowed to stand for 90 minutes at 5° C., then neutralized with a little solid carbon dioxide, much water is added and the dioxane completely removed in vacuum. The faintly turbid, aqueous solution is clarified by washing with a little ether and then acidified with dilute hydrochloric acid while cooling with ice. The orange flaky precipitate is suction-filtered, washed with much water until neutral and then dried. Yield: 108 mg. of orange resin melting at about 60–80° C. The product is sufficiently pure for further reactions.

EXAMPLE 8

$N^\alpha$-trityl-$N^\epsilon$-tertiary butyloxycarbonyl-L-lysyl-$N^\epsilon$-tertiary butyloxycarbonyl-L-lysine methyl ester 800 mg. of the oily dipeptide ester obtained in Example 6 are dissolved in 12 cc. of dry methylene chloride, and 500 mg. of pure triphenylchloromethane and 0.28 cc. of absolute triethylamine are added. After 22 hours at 20° C. the solution is diluted with ethyl acetate and washed with dilute citric acid solution and water while cooling with ice. The solution is dried with sodium sulfate and evaporated to yield 1.21 grams of resin. After being recrystallized several times from a mixture of ether and petroleum ether, crystallization occurs. 1.10 grams of trityl-dipeptide derivative melting at 132–135° C. are obtained. For the purpose of analysis the product is recrystallized from ether and petroleum ether; melting point 134–137° C.; optical rotation $[\alpha]_D^{24}$=+3.7°±0.8° (c.=1.09 in methanol).

The product can be selectively detritylated under mild conditions as described in Example 10(4) without the tertiary butyloxycarbonyl groups being attacked. The resulting $N^\epsilon$-tertiary butyloxycarbonyl-L-lysyl-$N^\epsilon$ - tertiary butyloxycarbonyl-L-lysine methyl ester is unitary according to paper-chromatography in several systems and identical with the product described in Example 6.

EXAMPLE 9

$N^\alpha$-trityl-$N^\epsilon$-tertiary butyloxycarbonyl-L-lysyl-$N^\epsilon$-tertiary butyloxycarbonyl-L-lysine 1.47 grams of the product obtained in Example 8 are hydrolyzed as described in Example 7. Analogous working up yields 1.18 grams of $N^\alpha$-trityl-$N^\epsilon$-tertiary butyloxycarbonyl-L-lysyl-$N^\epsilon$-tertiary butyloxycarbonyl-L-lysine as a powder melting at 73–100° C.; optical rotation $[\alpha]_D^{24}$=+1.0°±0.7° (c.=0.98 in methanol). The product is sufficiently pure for further reactions.

EXAMPLE 10

$N^\alpha$-trityl-$N^\epsilon$-tertiary butyloxycarbonyl-L-lysyl-$N^\epsilon$-tertiary butyloxycarbonyl-L-lysyl-nitro-L-arginyl-nitro-L-arginyl-L-proline tertiary butyl ester 33 mg. of dicyclohexylcarbodiimide are added to 102 mg. of $N^\alpha$-trityl-$N^\epsilon$-tertiary butyloxycarbonyl-L-lysyl-$N^\epsilon$-tertiary butyloxycarbonyl-L-lysine, 82 mg. of nitro-L-arginyl-nitro-L-arginyl-L-proline tertiary butyl ester and 3 cc. of dimethylformamide at −15° C., and the clear solution is allowed to stand for 30 minutes at −15° C. and for 4 days at 2° C. The precipitated dicyclohexylurea is then filtered off with suction (16 mg. M.P. 224–226° C.) and the filtrate liberated from dimethylformamide in a high vacuum. The residue is triturated with much petroleum ether and the undissolved powder taken up in ethyl acetate, a further 2 mg. of dicyclohexylurea remaining undissolved. The ethyl acetate solution is washed as usual until neutral with ice-cooling, dried with sodium sulfate and evaporated. The residue (105 mg. of resin) is triturated with ether for further purification and precipitated from acetone solution with ether. The resulting pentapeptide derivative melts at 125–160° C. It is a protected intermediate product in the synthesis of adrenocorticotropic hormones.

For further characterization a test sample is hydrolyzed with concentrated hydrochloric acid (90 minutes at 40° C.); the resulting L-lysyl-L-lysyl-nitro-L-arginyl-L-proline shows in paperchromatogram in the system n-butanol-3% ammonia solution (100:44) a path of 6 cm. (26 hours running time); with high voltage electrophoresis (45 volts/cm.; pH=1.9) a path of 15 cm. with 45 minutes running time (cf. lysine:17 cm.; lysyl-lysine 24 cm.).

Selective, mild detritylation as described under (4) yields N$^\epsilon$ - tertiary butyloxycarbonyl - L - lysyl N$^\epsilon$-tertiary butyloxycarbonyl - L - lysyl - nitro - L - arginyl-nitro - L - arginyl - L - proline tertiary butyl ester. In the paperchromatogram in the system n-butanol-ethanol-water (2:2:1) the substance shows an R$_f$ value of 0.87; in the system n-butanol-3% ammonia solution (100:44) 0.95.

The nitro - L - arginyl - nitro - L - arginyl - L - proline tertiary butyl ester used as starting material may be prepared as follows:

(1) N$^\alpha$-TRITYL-NITRO-L-ARGININE 20 grams of nitro-L-arginine are dissolved in 100 cc. of N-sodium hydroxide solution, and 20 cc. of diethylamine and 220 cc. of isopropanol are added. In the course of 15 minutes 36 grams of triphenylchloromethane are added and the whole thoroughly stirred for 2 hours at room temperature. The undissolved material is suction-filtered, washed with an aqueous solution of diethylamine of 10% strength and the filtrate liberated from isopropanol in vacuo. The resulting precipitate is again suction filtered, the filtrate washed with a little ether and adjusted to pH=2 with solid citric acid while cooling with ice at a maximum temperature of 5° C. The precipitated trityl-nitro-L-arginine is taken up in much ethyl acetate with ice-cooling, the ethyl acetate solution washed until neutral with ice water, dried with sodium sulfate and evaporated to dryness at 30° C. bath temperature in vacuo. The remaining resin (16.2 grams) is treated with a little methanol with ice-cooling, and then much ether is immediately added. The initially flaky precipitate slowly crystallizes at 2° C. 13.2 grams of crystalline trityl-nitro-L-arginine are obtained; M.P. (145° C.) 150–156° C.

(2) L-PROLINE TERTIARY BUTYL ESTER (a) *Hydrochloride.*—In a pressure flask 5 grams of dry L-proline, 150 cc. of dry alcohol-free chloroform, 5 cc. of pure concentrated sulfuric acid and 150 cc. of liquid isobutylene are agitated at room temperature until solution is complete (about 3 to 4 days). After cooling at −15° C. the pressure vessel is opened and the isobutylene distilled off in vacuo with the exclusion of moisture. The remaining chloroform solution is washed with 200 cc. of potassium carbonate solution of 20% strength with ice-cooling and dried with sodium sulfate. After suction-filtering the sodium sulfate, the content of L-proline tertiary butyl ester in the chloroform solution is determined by titrating a test sample with dilute hydrochloric acid. The remaining chloroform solution is then cooled to −15° C., and the exactly calculated quantity of hydrochloric acid in alcohol is added. Evaporation and trituration of the residue with ether yields 6.88 grams of crystalline L-proline tertiary butyl ester hydrochloride (76% of the theoretical yield) melting at (104° C.) 107–108° C. The product is extremely hygroscopic.

(b) *Free ester.*—For conversion into the free ester the hydrochloride is dissolved in as little water as possible, the solution covered with much ether and rendered strongly alkaline by the addition of concentrated potassium carbonate solution. The precipitating ester is taken up in ether; the ethereal solution is dried and evaporated to yield oily L-proline tertiary butyl ester which may be processed without further purification.

(3) TRITYL-NITRO-L-ARGINYL-L-PROLINE TERITARY BUTYL ESTER 9.15 grams of L-proline tertiary butyl ester and 24.7 grams of trityl-nitro-L-arginine are treated with 250 cc. of acetonitrile and the solution is cooled to −15° C. The salt formed from the two amino acid derivatives precipitates out. Regardless of this, 11.1 grams of dicyclohexylcarbodiimide are added and the mixture stirred for 72 hours at 2° C. The salt dissolves and a mixture consisting of much dicyclohexylurea and a little trityl-nitro-L-arginine anhydride separates. It is suction-filtered (10.4 grams, M.P. 210°/222–224° C.), and the filtrate evaporated to dryness in vacuo. The residue is taken up in ethyl acetate, washed with dilute citric acid solution, water, sodium bicarbonate solution and water with ice-cooling, dried with sodium sulfate and evaporated. The neutral constituents (30 grams of resin) are allowed to stand with a little methanol at 2° C., whereby 1.2 grams of trityl-nitro-L-arginine anhydride (M.P. 180–183° C.) separate. The filtrate is evaporated to dryness and crystallized from a mixture of acetone and ether. 15.4 grams of trityl-nitro-L-arginine-L-proline tertiary butyl ester melting at (171° C.) 174–176° C. are obtained. For the purpose of analysis the product is crystallized several times from a mixture of acetone and ether; M.P. 175–178° C.; optical rotation $[\alpha]_D^{25} = +37.10 \pm 0.7°$ (c.=1.24 in methanol).

(4) NITRO-L-ARGINYL-L-PROLINE TERTIARY BUTYL ESTER 1.00 gram of trityl-nitro-L-arginyl-L-proline tertiary butyl ester is dissolved in 15 cc. of acetic acid of 75% strength and allowed to stand for 30 minutes at 30° C., crystals of triphenylcarbinol precipitating. The reaction mixture is then evaporated to dryness in vacuo and the residue distributed between water and ether. The aqueous phase is washed with ether and both ethereal solutions are washed with a little dilute acetic acid. The aqueous phases are combined, concentrated to a small volume, covered with water-saturated n-butanol and rendered alkaline with concentrated potassium carbonate solution with ice-cooling. The precipitated free dipeptide ester is isolated by being extracted twice with n-butanol; the butanol solutions are washed with dilute sodium sulfate solution, dried with sodium sulfate, evaporated and dried in a high vacuum to yield 590 mg. of nitro-L-arginyl-L-proline tertiary butyl ester (98% of the theoretical yield) as a colorless resin. The product is unitary according to paper chromatography and may be processed without further purification.

(5) TRITYL-NITRO-L-ARGINYL-NITRO-L-ARGINYL-L-PROLINE TERTIARY BUTYL ESTER 582 mg. of nitro-L-arginyl-L-proline tertiary butyl ester and 818 mg. of trityl-nitro-L-arginine are suspended in 20 cc. of acetonitrile and the mixture cooled to −15° C., the salt of the two components separating. After the addition of 322 mg. of dicyclohexylcarbodiimide the reaction mass is stirred for 3 days at 2° C. The mixture of dicyclohexylurea and trityl-anhydro-nitro-L-arginine is then suction-filtered (297) mg., M.P. (170° C.) 211–217° C.) and the filtrate evaporated to dryness. The residue is taken up in chloroform and washed as usual with ice-cooling. The neutral constituents (1.31 grams of resin) are triturated with ether and the undissolved material (1.21 grams) treated with a little methanol to separate trityl-anhydro-nitro-L-arginine. 78 mg. melting at 180–184° C. remain undissolved. The filtrate is evaporated to dryness and the residue (914 mg.) subjected to a countercurrent distribution (Craig basic process with 42 distribution stages). (Solvent system: chloroform-carbon tetrachloride-methanol-water=5:5:8:2).

The bulk of the tripeptide derivative is in the fractions 10–20 (distribution number G=0.69). These fractions are combined (680 mg.) and precipitated from the acetone solution with ether. The so-obtained tripeptide derivative is a powder, M.P. about 125–150° C.; optical rotation $[\alpha]_D^{23} = -32.2° \pm 1.1°$ (c.=1.15 in methanol). After removal of the trityl- and tertiary butyl ester group by hydrolysis with concentrated hydrochloric acid (1 hour at 40° C.), the resulting nitro-L-arginyl-nitro-L-arginyl-L-proline is shown to be unitary in the paperchromatogram and has an R$_f$ value of 0.43

(system s-butanol-isopropanol-monochloracetic acid-water=70:10:3 g: 40)

(6) NITRO-L-ARGINYL-NITRO-L-ARGINYL-L-PROLINE TERTIARY BUTYL ESTER

The tripeptide derivative obtained under (5) is detritylated as described under (4) and the resulting acetic acid salt of the tripeptide ester converted into the free ester in exactly the same way. The free nitro-L-arginyl-nitro-L-arginyl-L-proline tertiary butyl ester is obtained in a 80% yield as a colorless resin. It is paperchromatographically pure. $R_f$ value=0.81 in the system s-butanol-isopropanol-triethylamine-veronal water=100:10:0.2:1.8 g:60

EXAMPLE 11

$N^\alpha$-(para-phenylazo-benyloxycarbonyl)-$N^\epsilon$-tertiary butyloxycarbonyl-L-lysyl-L-valyl-glycine ethyl ester 4.00 grams of dicyclohexylcarbodiimide are added at −15° C. to a solution of 5.47 grams of L-prolyl-L-valyl-glycine-ethyl ester and 8:85 grams of $N^\alpha$-(para-phenylazobenzyloxycarbonyl) - $N^\epsilon$ - tertiary butyloxycarbonyl-L-lysine in 150 cc. of acetonitrile. The mixture is first allowed to stand for 30 minutes at −15° C., then at 2° C., the reaction mixture gradually solidifying in a jelly-like mass. After 3 days at 2° C. much acetone is added, the orange jelly-like material dissolving and dicyclohexylurea remaining undissolved. It is suction-filtered (3.2 grams corresponding to 78% of the theory), the filtrate evaporated to dryness, the residue taken up in ethyl acetate and washed as usual until neutral with ice-cooling. The neutral constituents (14.72 grams of orange resin) are triturated several times with ether and the ether-insoluble material (12.6 grams of crude tetrapeptide derivative chromatographed for further purification. The material is dissolved in a mixture of benzene and chloroform (1:4) and poured on to a column of 600 grams of silica gel ("Davison," mesh 200, with the addition of 10% of water). Elution with another 3 liters of the same mixture yields 0.80 gram of material from which 290 mg. of dicyclohexylurea are obtained. The bulk of the orange material is washed out of the column by elution with 4 liters of chloroform. The intensely orange-red chloroform eluates yield a total of 11.87 grams of residue on being evaporated. The residue is dissolved in a little warm acetonitrile; on cooling slowly, a total of 9.72 grams of crystalline tetrapeptide derivative separate in clusters of needles melting at (147° C.) 149–151° C.

For the purpose of analysis recrystallization is carried out from acetone and acetonitrile; M.P. 151–152° C.; optical rotation $[\alpha]_D^{26}=-70.5°\pm1.1°$ (c.=1.02 in methanol). The product is a protected intermediate in the synthesis of adrenocorticotropic hormones.

The L-prolyl-L-valyl-glycine ethyl ester used as starting material may be prepared as follows:

(1) L-VALYL-GLYCINE ETHYL ESTER 25.8 grams of carbobenzyloxy-L-valyl-glycine ethyl ester are dissolved in 1 liter of ethanol, 65 cc. of 1.4 N-hydrochloric acid in ethanol are added and the solution hydrogenated in the presence of palladium carbon (10% Pd) using a second hydrogenation vessel filled with sodium hydroxide solution to collect the carbon dioxide formed. When hydrogenation is complete, the catalyst is filtered off with suction, the filtrate evaporated to dryness and the residue (20.6 grams of resin) treated with a little water, the bulk dissolving. A trace of undissolved material is removed by filtration, the filtrate covered with 700 cc. of ethyl acetate and rendered alkaline by the addition of potassium carbonate with ice-cooling. The precipitating oily dipeptide ester is taken up in ethyl acetate, the aqueous phase washed with another 700 cc. of ethyl acetate, both ethyl acetate phases combined, dried and evaporated. 18.5 grams of L-valyl-glycine-ethyl ester (oil) are obtained which must be processed immediately. The carbobenzyloxy-L-valyl-glycine-ethyl ester used as starting material is known.

(2) CARBOBENZYLOXY-L-PROLYL-L-VALYL-GLYCINE-ETHYL ESTER 13.9 grams of dicyclohexylcarbodiimide are added to a solution cooled to −15° C. of 13.6 grams of L-valyl-glycine-ethyl ester and 16.9 grams of carbobenzyloxy-L-proline in 300 cc. of acetonitrile. After standing for 30 minutes at −15° C. and for 18 hours at 2° C., the reaction mixture is completely crystallized. It is triturated with a little cold acetonitrile and suction-filtered. The crystallizate (29.7 grams) (mixture of carbobenzyloxy-L-prolyl-L-valyl-glycine-ethyl ester and dicyclohexyl-urea) is processed as described below. The acetonitrile filtrate is evaporated and, after being worked up in the usual manner in ethyl acetate, yields 13.0 grams of neutral constituents.

The crystallizate (29.7 grams) obtained directly from the reaction mixture is triturated with a little warm acetone, 13.7 grams of dicyclohexylurea remaining undissolved. The filtrate yields 16.0 grams of residue; the latter is combined with the above obtained neutral constituents (13.0 grams); crystallization from a very little hot acetonitrile yields a total of 24.1 grams of crystalline carbobenzyloxy-L-prolyl-L-valyl-glycine-ethyl ester (85% of the theoretical yield) of melting point 157–160° C.

For the purpose of analysis the product is crystallized from acetonitrile; M.P. 158–160° C.; optical rotation $[\alpha]_D^{29}=-87.4°\pm1.2°$ (c.=0.962 in methanol).

(3) L-PROLYL-L-VALYL-L-GLYCINE-ETHYL ESTER 8.00 grams of carbobenzyloxy-L-prolyl-L-valyl-glycine-ethyl ester are dissolved in 200 cc. of alcohol and hydrogenated in the presence of palladium carbon (10% Pd). The carbon dioxide formed is collected in a second hydrogenation vessel filled with sodium hydroxide solution. Hydrogenation ceases after the calculated quantity of hydrogen has been taken up. The catalyst is filtered off with suction, the solution evaporated to dryness and the crystalline residue triturated with a little ether and filtered with suction to yield 4.50 grams of L-prolyl-L-valyl-glycine-ethyl ester melting at 127–129° C.; the mother liquors yield from a little ether another 0.60 gram of tripeptide ester melting at 126–128° C. The yield of crystalline tripeptide ester amounts to 92% of the theoretical yield.

For the purpose of analysis the product is recrystallized from ether; M.P. 127–129° C.; optical rotation $[\alpha]_D^{25}=-74.8°\pm0.8°$ (c.=1.083 in ethanol).

EXAMPLE 12

$N^\alpha$-(para-phenylazo-benzyloxycarbonyl)-$N^\epsilon$-tetiary butyloxy-carbonyl-L-lysyl-L-prolyl-L-valyl-glycine The tetrapeptide ethyl ester obtained in Example 11 is hydrolysed in exactly the same manner as described in Example 7. Analogous working up yields $N^\alpha$-(para-phenylazo - benzyloxy-carbonyl)-$N^\epsilon$-tertiary butyloxycarbonyl-L-lysyl-L-prolyl - L - valyl - glycine in 97% yield in the form of a powder melting at 86–115° C.; the product is sufficiently pure for further reactions. For the purpose of analysis the product is crystallized from a mixture of acetone and ether; M.P. (122° C.) 127–132° C.; optical rotation $[\alpha]_D^{27}=-64.9°\pm1.1°$ (c.=0.80 in methanol).

EXAMPLE 13

$N^\epsilon$-tertiary butyloxycarbonyl-L-lysyl-L-prolyl-L-valyl-glycine-ethyl ester 900 mg. of the crystalline tetrapeptide derivative obtained in Example 11 are dissolved in 25 cc. of alcohol, 1 cc. of 2 N-aqueous acetic acid is added and the reaction mixture hydrogenated in the presence of palladium carbon (10% Pd), the carbon dioxide formed being absorbed in sodium hydroxide solution. After the calculated quantity of hydrogen has been taken up, hydrogenation ceases. Working up and conversion into the free ester are carried out in exactly the same way as described in Example 6. 601 mg. (97% of the theoretical yield) of tetrapeptide ester are obtained as a colorless resin. The product is pure according to paperchromatography, $R_f$ value =0.84 (system n-butanol-ethanol-water 2:2:1).

EXAMPLE 14

$N^a$-(para-phenylazo-benzyloxycarbonyl)-L-lysyl-L-prolyl-L-valyl-glycine-ethyl ester From the product obtained in Example 11 the tertiary butyloxycarbonyl group may be removed selectively as follows:

4 mg. of tetrapeptide derivative are treated with 0.4 2 N-hydrochloric acid in ethyl acetate and the solution allowed to stand for one hour at room temperature. The clear solution is then evaporated to dryness. The product is an orange resin. On being subjected to paperchromatography in various systems only one orange stain is obtained which shows a positive ninhydrin reaction ($N^ε$-amino group of the lysyl residue). $R_f$ value=0.77 (system n - butanol - ethanol - water=2:2:1); =0.80 (system t - amylalcohol - isopropanol - water=100:40:55); =0.95 (system s-butanol-3% ammonia=100:44).

EXAMPLE 15

$N^δ$-tertiary butyloxycarbonyl-L-ornithine 3.0 grams of L-ornithine monohydrochloride in 30 cc. of water are boiled under reflux with 3 grams of basic copper carbonate for 1½ hours. The excess copper carbonate is then suction-filtered with heating and washed with water. The resulting dark blue copper complex solution of the ornithine is treated with 20 cc. of dioxane, 3.75 grams of sodium bicarbonate and 4.9 cc. of tertiary butyloxycarbonyl azide and stirred for 4 days at 10°. The resulting precipitate is suction-filtered, washed thoroughly with water, alcohol and ether.

Copper complex of $N^δ$-BOC-ornithine =2.5 grams =53% of the theoretical yield.

For decomposition 2.5 grams of the copper complex are suspended in 75 cc. of water and 10 cc. of 2 N-acetic acid and treated for 30 minutes with hydrogen sulfide. The copper sulfide is suction-filtered, the filtrate concentrated at 40° C. in vacuo and the remaining solution lyophilized in a high vacuum. The powdery residue is dried in a high vacuum at room temperature over potassium hydroxide until the weight is constant. Yield of $N^δ$-BOC - ornithine=1.83 grams=44% of the theoretical yield; M.P. 216° C. (with decomposition, brown coloration from about 190° C.).

The product is readily soluble in water, methanol, and less readily soluble in ethanol. It precipitates from a mixture of methanol and ether in the form of a jelly.

Analysis ($C_{10}H_{20}O_4N_2$): Calculated—N=12.06. Found—N=11.82%.

EXAMPLE 16

$N^γ$-tertiary butyloxycarbonyl-L-α:γ-diaminobutyric acid (a) COPPER COMPLEX 1.55 grams of L-α:γ-diaminobutyric acid are dissolved in 30 cc. of water, 2.0 grams of basic copper carbonate are added and the whole heated for 20 minutes at the boil. The undissolved copper carbonate is filtered off with suction while still hot and rinsing carried out with a little warm water. The deep blue filtrate is concentrated to a volume of about 15 cc., treated with 1 gram of magnesium oxide and a solution of 2.15 grams of tertiary butyloxy-azido formate in 40 cc. of methanol and stirred for 18 hours at 40° C. The methanol is then distilled off in vacuo, the pale blue precipitate suction-filtered and washed with a little water and ether. The product still contains a little magnesium oxide. It is therefore thoroughly triturated with cold dilute acetic acid solution, suction-filtered and washed with water until neutral. The yield amounts to 1.05 grams; M.P. 229–233° C. (with decomposition).

(b) FREE $N^γ$-TERTIARY BUTYLOXYCARBONYL-L-α:γ-DIAMINOBUTYRIC ACID FROM THE COPPER COMPLEX

The derivative is liberated from the copper complex in the same manner as described in Example 1(b). The product is obtained in the form of a fine jelly-like precipitate (from water). M.P. 217–229° C. (with decomposition). The substance is soluble in dilute alkali and dilute acetic acid; soluble in dilute mineral acids with decomposition. $R_f$ value=0.65 (system n-butanol-ethanol-water=2:2:1); 0.60 (system n-butanol–3% ammonia =100:44); 0.74 (system secondary butanol-isopropanol-monochloracetic acid-water=70:10:3:40).

What is claimed is:

1. In a process for the temporary protection, in peptide synthesis of the amino group of the aminoalkyl radical of a member selected from the group consisting of α-(aminoalkyl)-α-amino acetic acids and their derivatives, in which the α-amino group is blocked by a blocking group which may be eliminated by hydrogenolysis and the carboxyl group is in the form of a member selected from the group consisting of free carboxyl, lower alkyl ester, unsubstituted hydrazide and unsubstituted amide, which comprises acylation and subsequent splitting off of the acyl group, the improvement wherein the said amino group is acylated by the azide of carbonic acid tertiary butylsemiester.

2. Process as claimed in claim 1, wherein the tertiary butyloxycarbonyl radical is introduced into a copper complex of the α-(aminoalkyl)-α-amino-acetic acid.

3. Process as claimed in claim 1, wherein lysine is used as α-(aminoalkyl)-α-amino-acetic acid.

4. α-(Tertiary butyloxycarbonylamino-alkyl)-α-amino-acetic acids.

5. $N^ε$-(tertiary butyloxycarbonyl)-L-lysine.

6. α-(Tertiary butyloxycarbonylaminoalkyl)-α-amino-acetic acids and derivatives of these compounds in which the α-amino group is protected by a member of the group consisting of the para - (phenylazo) - benzyloxycarbonyl group, the para - (para'-methoxy-phenylazo)-benzyloxycarbonyl group, the carbobenzoxy group and the triphenylmethyl group and the carboxyl group is in the form of a member selected from the group consisting of free carboxyl, lower alkyl ester, unsubstituted hydrazide and unsubstituted amide.

7. $N^ε$-tertiary butyloxycarbonyl-L-lysine methyl ester.

8. Peptides containing the radical of an α-aminoalkyl-α-aminoacetic acid in which the amino group of the aminoalkyl radical is protected by the tertiary butyloxycarbonyl radical.

9. $N^ε$-tertiary butyloxycarbonyl-L-lysine lower alkyl ester.

10. Peptides containing the radical of L-lysine, in which the amino group of the aminoalkyl radical is protected by the tertiary butyloxycarbonyl radical.

References Cited by the Examiner

UNITED STATES PATENTS 2,524,422 10/1950 Boothe et al.
2,932,635 4/1960 Amiard et al. _____ 260—112
3,062,804 11/1962 Albertson _____ 260—112

OTHER REFERENCES

Anderson et al.: J. Am. Chem. Soc., vol. 79, pp. 6180–6183 (1957).

McKay et al.: J. Am. Chem. Soc., vol. 79, pages 4686–4690 (1957).

LEWIS GOTTS, Primary Examiner.

CHARLES B. PARKER, Examiner.

S. H. LIEBERSTEIN, P. A. STITH, Assistant Examiners.